US012737798B2

(12) United States Patent
Lerner et al.

(10) Patent No.: US 12,737,798 B2
(45) Date of Patent: Sep. 15, 2026

(54) VECTOR-BASED SYSTEM FOR PREDICTIVE RECOMMENDATION GENERATION

(71) Applicant: FedEx Dataworks, Inc., Memphis, TN (US)

(72) Inventors: Jeremy Lerner, Southfield, MI (US); Sean Livelsberger, Hawthorn Woods, IL (US); Gregory Gandenberger, Mt Prospect, IL (US)

(73) Assignee: Federal Express Corporation, Memphis, TN (US)

( * ) Notice: Subject to any disclaimer, the term of this patent is extended or adjusted under 35 U.S.C. 154(b) by 171 days.

(21) Appl. No.: 18/421,929

(22) Filed: Jan. 24, 2024

(65) Prior Publication Data

US 2025/0238849 A1 Jul. 24, 2025

(51) Int. Cl.
*G06Q 30/00* (2023.01)
*G06Q 30/0601* (2023.01)

(52) U.S. Cl.
CPC ................................ *G06Q 30/0631* (2013.01)

(58) Field of Classification Search
CPC ................................................ G06Q 30/06–08
See application file for complete search history.

(56) References Cited

U.S. PATENT DOCUMENTS

| | | | | |
|---|---|---|---|---|
| 11,861,675 B2 * | 1/2024 | Al Jadda | .................. | G06N 3/09 |
| 2022/0148062 A1 * | 5/2022 | Sinha | ..................... | G06N 20/00 |
| 2022/0245704 A1 * | 8/2022 | Xie | .................... | G06Q 30/0631 |
| 2023/0245208 A1 * | 8/2023 | Zhang | ....................... | G06T 7/90 |

OTHER PUBLICATIONS

Iqbal, Murium, et al., “A Mutimodal Recommender System for Large-scale Assortment Generation in E-commerce”, ACM Special Interest Group on Information Retrieval, arXiv:1806.11226v1 [cs. IR], Jun. 28, 2018 (Year: 2018).*

* cited by examiner

*Primary Examiner* — Ethan D Civan
(74) *Attorney, Agent, or Firm* — FINNEGAN, HENDERSON, FARABOW, GARRETT & DUNNER, LLP

(57) ABSTRACT

A system for recommending products, wherein the system is configured to train a machine learning model to predict a seed product for a user from a product database, predict the seed product for the user using the machine learning model, and encode an image of the seed product into a vector representation of the seed product. The system is further configured to receive information indicative of the user's product preferences, modify the vector representation of the seed product based on the user's product preferences, and search vector representations of products to find a vector representation that is the closest match. The system may further output, based on the results of the search, a recommended product from the product database corresponding to the closest match vector, to the user.

21 Claims, 7 Drawing Sheets

VECTOR-BASED SYSTEM FOR PREDICTIVE RECOMMENDATION GENERATION

TECHNICAL FIELD

The present disclosure generally relates to computerized systems and methods for providing advanced product search capabilities. In particular, embodiments of the present disclosure relate to inventive and unconventional systems for providing search capabilities using tracked user interactions on a user interface and one or more machine learning models.

BACKGROUND

Consumers often have individual preferences for products with certain attributes. These attributes may be more complicated than attributes reflected by traditional product tags associated with available products, such as type of clothes (e.g., pants, tops etc.), color, or size. Instead, consumers may prefer a product based on the style, shape, association with popular culture, occasion appropriateness, or other attributes that are often not generated with traditional product tags. Creating tags to capture each of these more complicated product attributes can take up significant computing power. For example, a computer may need to run a separate machine learning model to detect each product attribute for a class of products (e.g., fit for dresses). Further, storing information at that granular a level may be technically impractical or impossible. Creating static data, such as product tags, to track all the product attributes that a consumer may have preferences on may cause rapid depletion of computer storage space. Further, it may be time consuming for a consumer to select all the various product tags and search through available products to find a product they prefer. It may also be time consuming for the consumer to re-select all the various product tags and re-search the available products each time they desire to purchase a new product with their preferred attributes. The loading and reloading of product information in accordance with various product tag selections and re-selections may overload a computerized system hosting the company webpage.

Therefore, there is a need for a system that can recommend products with consumer preferred attributes. Further, there is a need for a system that can provide an updated recommended product based on user input, wherein the updated product still includes relevant consumer preferred attributes.

SUMMARY

One aspect of the present disclosure is directed to a vector-based system for predictive recommendation, the system comprising a memory storing instructions, a machine learning model trained for predicting a seed product, a machine learning model trained for predicting a seed product, and at least one processor configured to execute the instructions to: predict the seed product from a product database for a user using the machine learning model and encode an image of the seed product into a vector representation of the seed product. Then at least one processor may be further configured to receive information indicative of the user's product preferences, modify the vector representation of the seed product based on the user's product preferences to obtain a modified seed product vector and search vector representations of products in the product database using the modified seed product vector to find a vector representation that is the closest match to the modified seed product vector. The at least one processor may be further configured to output to the user, based on the results of the search, a recommended product from the product database corresponding to the closest match vector.

The information indicative of the user's product preferences may be based on the user's interactions with a device. Further, the user's interactions may include at least one of: clicking on information associated with a product, viewing information associated with a product, adding a product for checkout, returning a product, or purchasing a product. The at least one processor may be further configured to generate a user interface for sending to the device for display, wherein the user's interactions include at least one of: typing product preferences on the user interface, selecting a displayed text description of product preferences on the user interface, uploading an image to the user interface, selecting an image generated on the user interface, or inputting weights for product preferences on the user interface. Outputting a recommended product to the user may include at least one of: generating an email to the user with information on the recommended product, generating a user interface for sending to a device for display with information on the recommended product, generating a mobile push notification for sending to a device for display with information on the recommended product, generating an advertisement push notification for sending to a device for display with information on the recommended product, adding information on the recommended product to a queue for sending to a device for display, wherein the display time is based on at least one of: queue position, time of day, or geolocation, generating an SMS notification for sending to a device for display with information on the recommended product, or generating an MMS notification for sending to a device for display with information on the recommended product.

The at least one processor may be further configured to: train the machine learning model, train a second model to detect whether a product image is a flat lay image of the product, determine which images in the product database are flat lay images of the product using the second model, and wherein predicting the seed product for the user comprises predicting the seed product from the determined flat lay images of the product.

Searching the product database may comprise searching using a vision and language model trained to have large cosine similarity for correct pairings of image and text and small cosine similarity for incorrect pairings of image and text. The vision and language model may be a neural network trained with at least one of: pairings of product images and corresponding text or pairings of non-product images and corresponding text. Modifying the vector representation of the seed product may include at least one of: adding a vector representation of the user's product preferences to the vector representation of the seed product or subtracting a vector representation of the user's product preferences from the vector representation of the seed product. The at least one processor may train the machine learning model and the machine learning model may receive at least one of the following as input for the seed product prediction: information on the user's demographics, information on the user's purchase history, information on the user's interaction with an interface displaying product information, or information on user provided preferences.

Training the machine learning model may comprise training the machine learning model to determine attribute categories that impact consumer behavior; and modifying the vector representation of the seed product comprises: creating a vector representation of the user's product preferences corresponding to one or more of the attribute categories, and modifying the vector representation of the seed product using the vector representation of the user's product preferences to obtain the modified seed product vector. The closest match vector may be the vector representation with the greatest cosine similarity to the modified seed product vector. The at least one processor may be further configured to output a second recommended product from the product database corresponding to a vector representation with the second greatest cosine similarity to the modified seed product vector.

Another aspect of the present disclosure is directed to a method for vector-based predictive recommendation generation, comprising: predicting the seed product from a product database for a user using a machine learning model trained for predicting a seed product, and encoding an image of the seed product into a vector representation of the seed product. The method further comprising receiving information indicative of the user's product preferences, modifying the vector representation of the seed product based on the user's product preferences to obtain a modified seed product vector and searching vector representations of products in the product database using the modified seed product vector to find a vector representation that is the closest match to the modified seed product vector. The method may further comprise outputting to the user, based on the results of the search, a recommended product from the product database corresponding to the closest match vector.

The information indicative of the user's product preferences may be based on the user's interactions with a device. Further, the user's interactions may include at least one of: clicking on information associated with a product, viewing information associated with a product, adding a product for checkout, returning a product, or purchasing a product. The method may further comprise generating a user interface for sending to the device for display, wherein the user's interactions include at least one of: typing product preferences on the user interface, selecting a displayed text description of product preferences on the user interface, uploading an image to the user interface, selecting an image generated on the user interface, or inputting weights for product preferences on the user interface. Outputting a recommended product to the user may include at least one of: generating an email to the user with information on the recommended product, generating a user interface for sending to a device for display with information on the recommended product, generating a mobile push notification for sending to a device for display with information on the recommended product, generating an advertisement push notification for sending to a device for display with information on the recommended product, adding information on the recommended product to a queue for sending to a device for display, wherein the display time is based on at least one of: queue position, time of day, or geolocation, generating an SMS notification for sending to a device for display with information on the recommended product, or generating an MMS notification for sending to a device for display with information on the recommended product.

The method may further comprise training the machine learning model; training a second model to detect whether a product image is a flat lay image of the product, determining which images in the product database are flat lay images of the product using the second model, and wherein predicting the seed product for the user comprises predicting the seed product from the determined flat lay images of the product.

Other systems, methods, and computer-readable media are also discussed herein. Disclosed embodiments may include any of the above aspects alone or in combination with one or more aspects, whether implemented as a method, by at least one processor, and/or stored as executable instructions on non-transitory computer readable media.

DETAILED DESCRIPTION

Figure 1A:
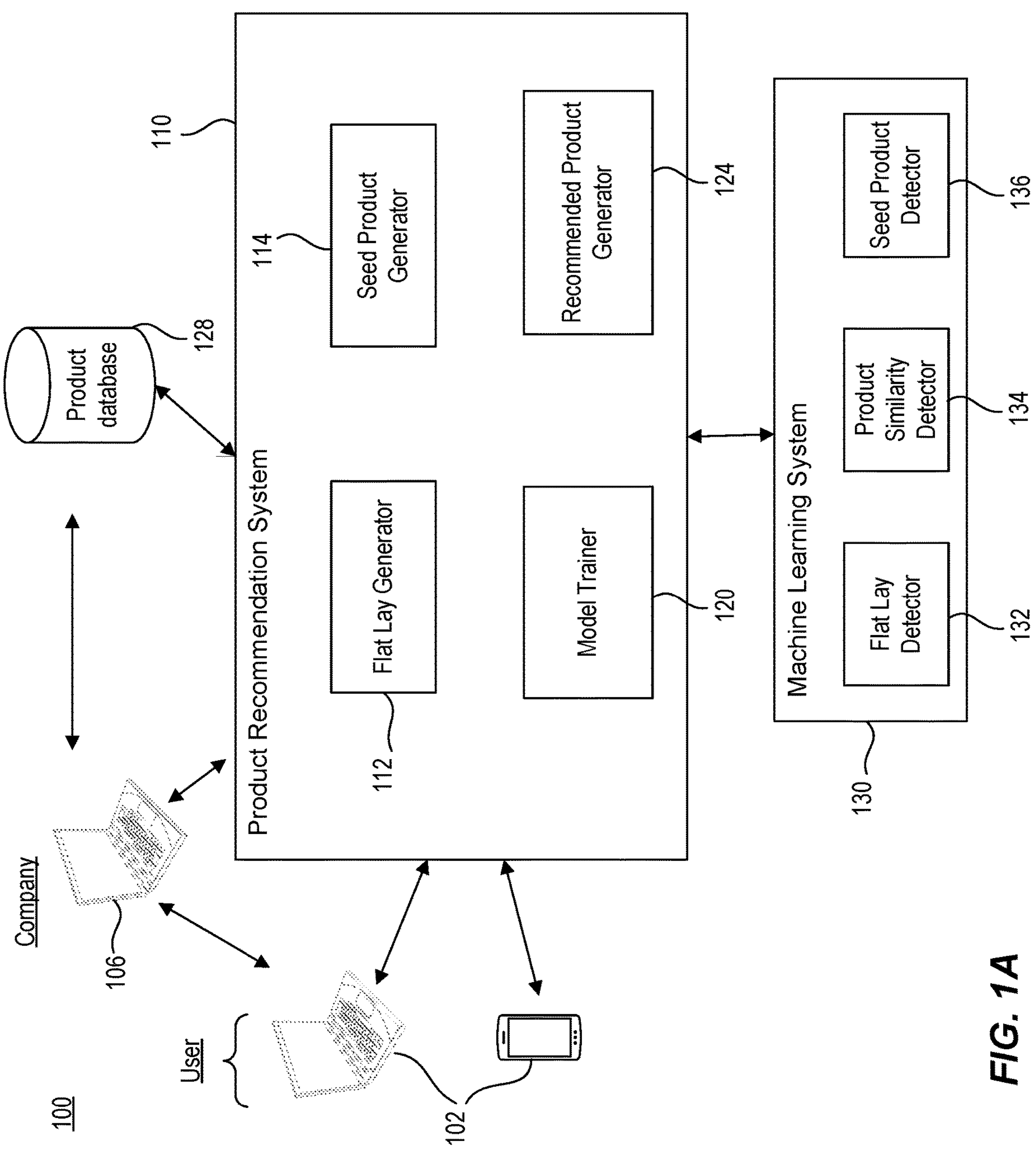
FIG. 1A is a schematic block diagram illustrating an exemplary embodiment of a network comprising computerized systems for providing product recommendations, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

FIG. 1A is a schematic block diagram illustrating an exemplary embodiment of a network comprising computerized systems for providing product recommendations, consistent with the disclosed embodiments. As illustrated, system 100 may include a variety of systems, each of which may be connected to one another via one or more wireless networks. The systems may also be connected to one another via one or more direct connections, for example, using cables. The depicted systems include Product Recommendation System 110, User Device(s) 102, Company Device(s) 106, Product Database 128, and Machine Learning System 130. In some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like.

User Device(s) 102 may include one or more computers, laptops, tablets, mobile phones, smart phones, PDAs, or any other computerized system that allows for a user to interact with a webpage of a company associated with Company Device(s) 106. User Device(s) 102 may include at least one processor (such as an x86 or x64 compatible processor), at least one memory storage device (such as flash memory), and at least one display. User Device 102 may provide an interface allowing a user to click on or otherwise interact with a user interface element to view additional details on a product (e.g., size, color options, store locations where available), view a product image (e.g., enlarge the product image), add a product for checkout, input payment information, return a product, purchase a product, and/or input product preferences.

Company Device(s) 106 may include one or more computers, laptops, tablets, mobile phones, smart phones, PDAs, or any other computerized system that allows for company user to interact with, for example, Product Recommendation System 110 and/or User Device(s) 102, manage a company webpage, and/or update Product Database 128. A company user may be a person acting on behalf of a company associated with Company Device(s) 106. Company Device(s) 106 may include at least one processor (such as an x86 or x64 compatible processor), at least one memory storage device (such as flash memory), and at least one display. In some embodiments, Company Device(s) 106 may provide an interface that allows a company user to set recommended product preferences and/or set parameters for user notifications (e.g., frequency of notices, associated user identifiers etc.). Company Device(s) 106 may further provide an interface that allows a company user to make changes to Product Database 128, such as by adding new product information and/or removing product information.

Product Database 128 may include one or more computer systems, memory storage devices, servers, and/or cloud databases that store product information. Product Database 128 may include one or more software programs allowing Product Database 128 to store, organize, and retrieve product information in a variety of different manners. For example, Product Database 128 may include an object-oriented type (system(s), relational system(s), column oriented system(s), document oriented system(s), NoSQL system(s), NewSQL system(s), and/or block-chain system(s). In some embodiments, product information for a product may include a product identifier, product image, product details, product type tags, and/or flat lay tags. Product Database 128 may store product information in a manner that allows for Product Recommendation System 110 and/or Company Device(s) 106 to easily search the product information. For example, Product Database 128 may include a category identifier which identifies product images separate from product details. Further, Product Database 128 may associate all product information for a single product together (e.g., by associating it all with a single product identifier).

Machine Learning System 130 may comprise one or more systems storing machine learning algorithms and/or models to be used by one or more systems of Product Recommendation System 110, as further described below. Machine Learning System 130 may comprise machine learning models, including: Flat Lay Detector 132, Product Similarity Detector 134, and/or Seed Product Detector 136. Machine Learning System 130 may include at least one processor and at least one memory storage device, a computer, a computerized system, a server, and/or a cloud computing platform storing one or more of the machine learning models.

Flat Lay Detector 132 machine learning model may identify product images as flat lay images when a product is not being worn by a model and/or when the product image does not include background scenery. As further described below, in some embodiments, flat lay images are provided to Seed Product Detector 136. Vectors created with flat lay images are more effective for determining other similar product vectors because they are not influenced by the unrelated background scenery and/or model. Seed Product Background scenery may include any items in the image that are not the product or any items in the image that are not the product and model (e.g., grass, sky, dog etc.). In some embodiments, the Flat Lay Detector 132 may include an image classification model (e.g., a convolution neural network or a residual network) to determine whether an image is a flat lay image. Further description of Flat Lay Detector 132 and associated training is provided herein.

Product Similarity Detector 134 machine learning model may determine how similar available products are to inputted image or text. In some embodiments, Product Similarity Detector 134 machine learning model may include a Contrastive Language-Image Pre-Training (CLIP) model, as further described below with reference to FIG. 1B. Product Similarity Detector 134 machine learning model may convert text and/or images into vector form for comparison. Further, Product Similarity Detector 134 may recommend an available product whose vector has the largest cosine similarity to the vector created based on the inputted text and/or images. Further description of Product Similarity Detector 134 and associated training is provided herein.

Seed Product Detector 136 machine learning model may determine a seed product based on user information tracked and/or received from User Device(s) 102. In some embodiments, Seed Product Detector 136 machine learning model may include one or more collaborative filtering models that receives information on a plurality of users (e.g., through Seed Product Generator 114 and/or User Devices 102). The collaborative filtering model(s) may determine similarities between users (e.g., their interactions and/or characteristics) and their consumer behaviors to suggest a seed product(s) that a consumer might find of interest. The collaborative filtering model(s) determines the seed product(s) based on other users with overlapping similarities finding the product's attributes of interest and undertaking beneficial consumer behavior. For example, Seed Product Detector 136 machine learning model may group user interactions with beneficial consumer behavior (e.g., a purchased product, a product with payment information entered, and/or a product added for checkout). For example, Seed Product Detector 136 machine learning model may group user characteristics with product attributes that may cause a user with those characteristics to find products of interest and undertake beneficial consumer behavior.

In some embodiments, Seed Product Detector 136 machine learning model may include one or more user preference models, such as an attribute weighting model, an attribute ranking model, and/or a user-specific collaborative filtering model, that receives information from a specific user (e.g., through Seed Product Generator 114 and/or User Device(s) 102). Seed Product Detector 136 machine learning model may group user selections with product attributes that may cause a user with those selections to undertake beneficial consumer behavior.

As described above, in some embodiments, Seed Product Detector 136 machine learning model may include one or more collaborative filtering models to determine the seed product. In some embodiments, the collaborative filtering model(s) include matrix factorization with a user-item matrix to learn user-item interactions, such as the relationship between user interactions, user characteristics, and/or user selections and product attributes of preferred products (determined by tracking beneficial consumer behavior). In some embodiments, the collaborative filtering model(s) use low rank matrix factorization to determine these relationships. In some embodiments, the collaborative filtering model(s) include neural collaborative filtering to determine these relationships in lieu of a user-item matrix.

In some embodiments, a company user through Company Device(s) 106 may assign weights for Seed Product Detector 136 machine learning model, such as weights for one or more values associated with user interactions, user characteristics, and/or user selections. Further description of Seed Product Detector 136 and associated training is provided herein.

Product Recommendation System 110 may comprise one or more systems to provide product recommendations to a user through User Device(s) 102. Product Recommendation System 110 may include a Flat Lay Generator 112, Seed Product Generator 114, Recommended Product Generator 124, and Model Trainer 120.

Flat Lay Generator 112 may tag product images within Product Database 128 that are flat lay images using Flat Lay Detector 132 machine learning model.

Seed Product Generator 114 may track user information on User Device(s) 102 and/or receive user information from User Device(s) 102. Seed Product Generator 114 may use Seed Product Detector 136 machine learning model to determine a seed product for a user based on user interactions, user selections, and/or user characteristics as further detailed below.

Recommended Product Generator 124 may receive user selections on User Device(s) 102 and/or company user selections on Company Device(s) 106 and may determine a recommended product for the user using Seed Product Detector 136 machine learning model and/or Product Similarity Detector 134 machine learning model. Product Recommendation System 110 and/or the systems included in Product Recommendation System 110 may include at least one processor (such as an x86 or x64 compatible processor) and at least one memory storage device (such as flash memory), a computer, a computerized system, and/or a server.

As describe above, one or more systems may track user interactions. In some embodiments, User Device(s) 102 and/or Product Recommendation System 110 may track user interactions on a company webpage of a company associated with Company Device(s) 106. In some embodiments, Company Device(s) 106 and/or Product Recommendation System 110 may install a click tracker on the company webpage to track user interactions on User Device(s) 102. The click tracker may include installing cookies associated with a product page and/or a click map that tracks user interactions with product images and/or details. In some embodiments, Company Device(s) 106 and/or Product Recommendation System 110 may install an impression tracker on User Device(s) 102 to track user interactions on User Device(s) 102. For example, the impression tracker may include a transparent image associated with product images and/or details. Each time the product images and/or details are loaded for display the associated transparent image is loaded for display and the impression tracker counts an impression.

The Company Device(s) 106 and/or Product Recommendation System 110 may code the click tracker and/or impression tracker to provide information on the type of user interactions. For example, in some embodiments, Product Recommendation System 110 may code the click tracker and/or impression tracker on the company webpage to provide information to the Seed Product Generator 114 on a user identifier, a product identifier, and a type of interaction. A type of interaction may include viewing additional details on a product, viewing a product image, adding a product for checkout, inputting payment information, returning a product, and/or purchasing a product. In some embodiments, Product Recommendation System 110 (e.g., Seed Product Generator 114) may store user identifiers, product identifiers, and/or type of interactions in a memory of Product Recommendation System 110.

As described above, one or more systems may receive user selections. Product Recommendation System 110 (e.g., Seed Product Generator 114 and Recommended Product Generator 124) may receive user selections made on an interface of User Device(s) 102 on preferred product attributes and/or modifications to product attributes (e.g., through the company webpage). Further, as described above, one or more systems (e.g., Seed Product Generator 114) may receive user characteristic information. User Device(s) 102 may track user characteristic information based on user interactions on webpages, social media platforms, or device applications (e.g., through one or more click trackers or impression trackers). For example, user characteristic information may include elements such as user gender, user age, user home location, and/or user interests (e.g., sports, dance, concerts etc.), and User Device(s) 102 (or one or more other devices in system 100) may derive one or more of these elements by tracking user interactions that correspond to these characteristic categories. For example, User Device(s) may determine a user likes sports based on tracking that the user views and/or clicks a sports team's webpage. User Device(s) 102 may send user characteristic information and an associated user identifier to Seed Product Generator 114. In some embodiments, Product Recommendation System 110 (e.g., Seed Product Generator 114) may store user identifiers, user selections, and/or user characteristics in a memory of Product Recommendation System 110.

Model Trainer 120 may train the machine learning models in Machine Learning System 130. In some embodiments, Model Trainer 120 may train Flat Lay Detector 132 using training images. For example, Model Trainer 120 may train Flat Lay Detector 132 using training images labeled as flat lay images where products are not being worn by a model and/or no background scenery is included. For example, Model Trainer 120 may train Flat Lay Detector 132 using training images labeled as not flat lay images where products are being worn by a model and/or background scenery is included. In some embodiments, Model Trainer 120 may train Flat Lay Detector 132 using training images where background scenery pixels, model pixels, and/or product pixels are labeled accordingly. Flat Lay Detector 132 may be trained to identify whether an image is a flat lay image where no model pixels and/or background scenery pixels are included. In some embodiments, Model Trainer 120 may employ reinforcement learning using rewards and/or punishments based on correct and/or incorrect identification. In some embodiments, Model Trainer 120 may receive training images from Company Device(s) 106.

In some embodiments, Model Trainer 120 may train Seed Product Detector 136 by providing Seed Product Detector 136 user interactions (e.g., from User Device(s) 102) leading up to a beneficial consumer behavior, such as purchasing a product, entering payment information for a product, and/or adding a product for checkout. Model Trainer 120 may train Seed Product Detector 136 to determine which user interactions (e.g. views or clicks) lead to beneficial consumer behavior. For example, the Seed Product Detector 136 may determine that users who viewed a product (e.g., as determined by a tracking on User Device(s) 102) are likely to buy a similar product within a window of time after the view. Therefore, Seed Product Detector 136 may set the viewed product as the seed product and/or increase the weight of product attributes of the viewed product when determining the seed product.

In some embodiments, Model Trainer 120 may provide Seed Product Detector 136 user characteristic information, product identifiers of products associated with beneficial consumer behavior (e.g., a purchased product, a product with payment information entered, and/or a product added for checkout), and/or product attributes for the product associated with beneficial consumer behavior. Model Trainer 120 may train Seed Product Detector 136 to group user characteristics (e.g., user gender, age range(s), home location region(s), and/or interest(s)) with products (e.g., product identifiers) or product attributes with which a user is likely to have beneficial consumer behavior. In some embodiments, product attributes may be product type tags created through manual input (e.g., through Company Device(s) 106) and/or image recognition models. For example, Seed Product Detector 136 may determine that women from California are more likely to have positive consumer behavior (e.g., make a purchase) with products that are loose fit and pastel colored. Therefore, Seed Product Detector 136 may set a product with these attributes as the seed product and/or increase the weight of these attributes when determining the seed product.

Model Trainer 120 may train Product Similarity Detector 134 to identify products that are similar to provided images and/or provided text. In some embodiments, Model Trainer 120 may provide pairings of product images and corresponding text and/or pairings of non-product images and corresponding text. In some embodiments, the corresponding text may be a caption describing the image, while in other embodiments the text may simply relate to the image.

In some embodiments, a company user on Company Device(s) 106 may upload and/or provide location(s) (e.g., web address) for training on new text and/or new images, such as text and/or images corresponding to a particular movie, TV show, news article, magazine, celebrity, and/or newly available products. For example, Model Trainer 120 may use new text and/or new images to train Product Similarity Detector 134 to associate name of a particular movie character (e.g., “Winnie the Pooh”) with clothing attributes (e.g., a red, tight-fitting crop-top). For example, Model Trainer 120 may use new text and/or new images to train Product Similarity Detector 134 to associate text of an event (e.g., “football”, “funeral”, “mother of the bride at summer wedding”) with clothing attributes (e.g., loose fitting jersey, black formal wear, knee-length single-colored dress). For example, Model Trainer 120 may use new text and/or new images to train Product Similarity Detector 134 to associate text (e.g., “summer”) with product attributes of new products (e.g., newly available summer dresses included in Product Database 128).

Figure 1B:
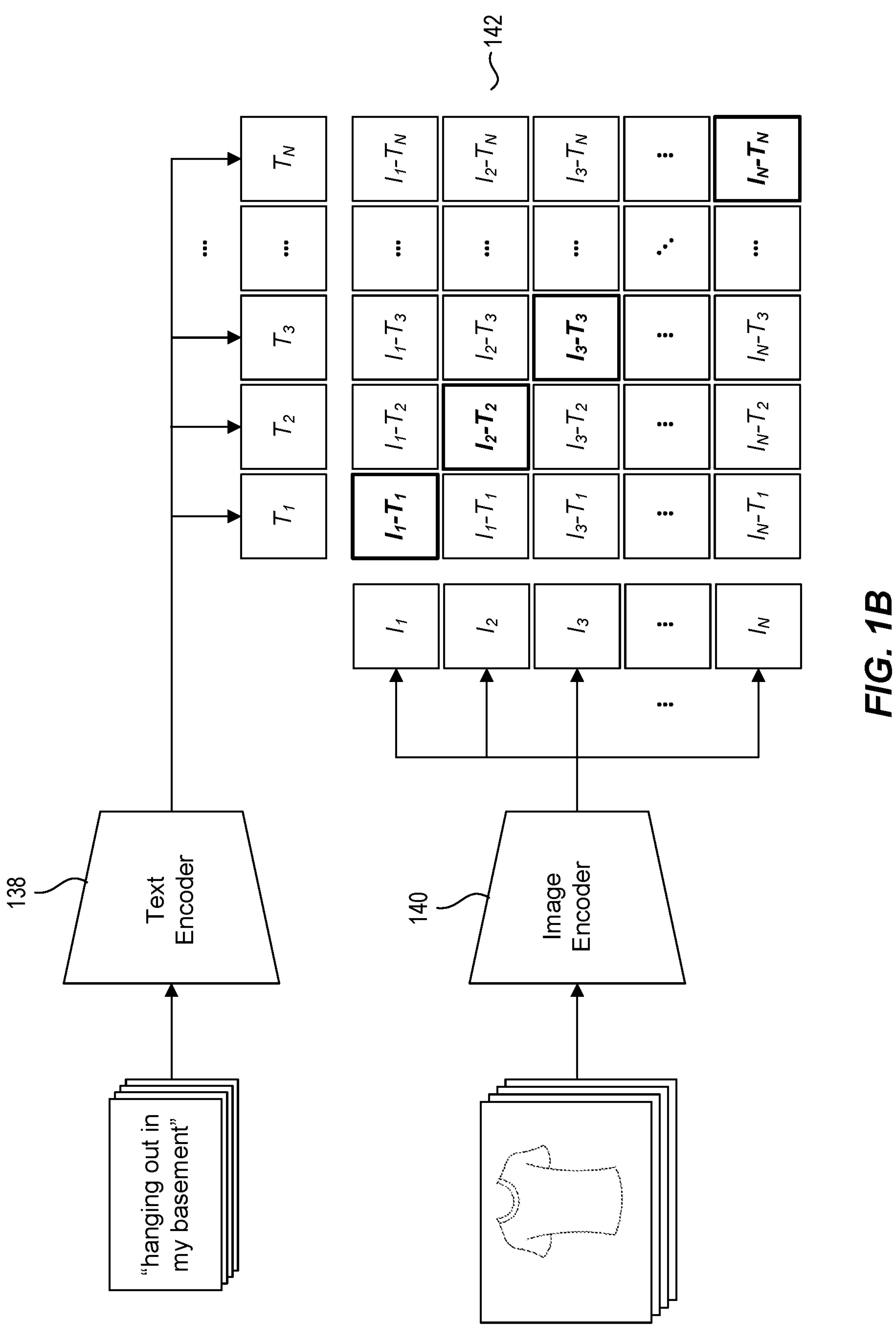
FIG. 1B is a schematic block diagram illustrating an exemplary embodiment of a machine learning model to detecting product similarities, consistent with the disclosed embodiments.

FIG. 1B is a schematic block diagram illustrating an exemplary embodiment of a machine learning model to detecting product similarities, consistent with the disclosed embodiments. As described above, in some embodiments, Product Similarity Detector 134 may include a Contrastive Language-Image Pre-Training (CLIP) model. The CLIP model may include Text Encoder 138 model and Image Encoder 140 model. Grid 142 represents possible pairings of generalizable vectors created by Image Encoder 140 and Text Encoder 138. The correct pairings of vectors are represented along the diagonal in bold.

Text Encoder 138 may transform text into a generalizable vector comparable to vectors created by Image Encoder 140. For example, Text Encoder 138 may include a model that provides a generalizable vector for one or more words, such as a Continuous Bag of Words (CBOW) neural network model and/or a Bidirectional Encoder Representations for Transformers (BERT) model. As described above, Model Trainer 120 may train Text Encoder 138 to produce vectors having a large cosine similarity with corresponding vectors created by Image Encoder 140 (e.g., as represented along the diagonal) and a small cosine similarity with non-corresponding vectors created by Image Encoder 140 (e.g., as represented off the diagonal). In some embodiments, the CLIP module (including Text Encoder 138 and Image Encoder 140) may be implemented by one or more software packages and software modules.

Image Encoder 140 may transform images into a generalizable vector comparable to vectors created by Text Encoder 138. For example, Image Encoder 140 may include a model that provides a generalizable vector for an image, such as a Residual Network (ResNet) model and/or a Vision Transformer model. As described above, Model Trainer 120 may train Image Encoder 140 models to produce vectors having a large cosine similarity with corresponding vectors created by Text Encoder 138 (e.g., as represented along the diagonal in grid 142) and a small cosine similarity with non-corresponding vectors created by Text Encoder 138 (e.g., as represented off the diagonal in grid 142).

Figure 2:
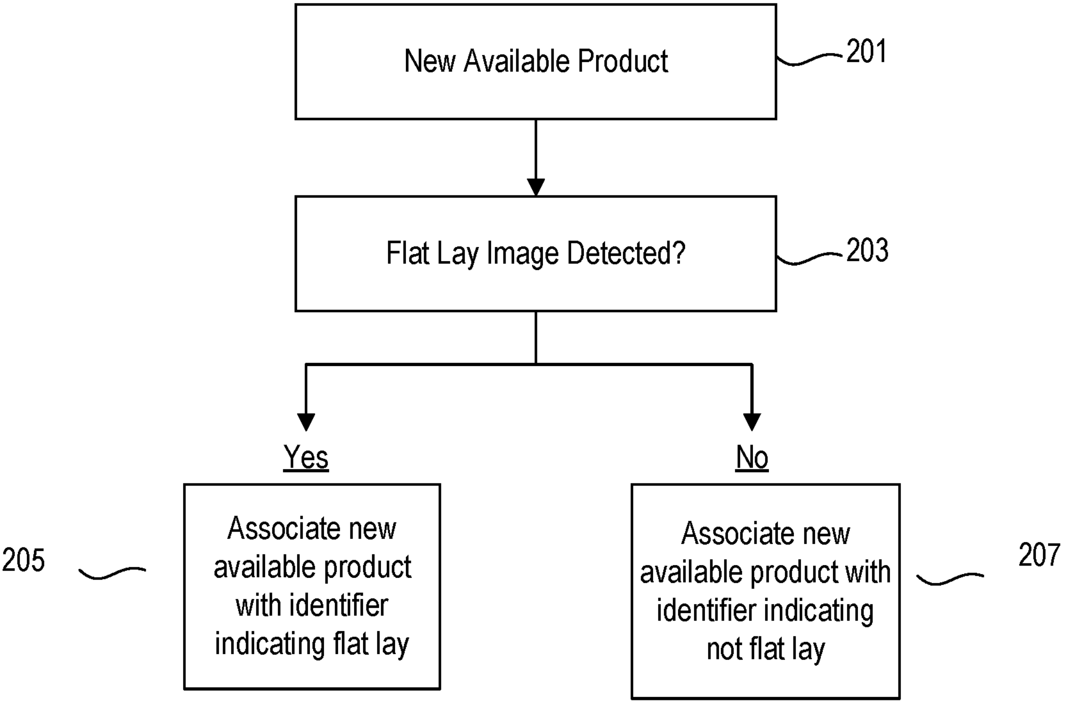
FIG. 2 illustrates a flow chart for determining flat lay images, consistent with the disclosed embodiments.

FIG. 2 illustrates a flow chart for determining flat lay images, consistent with the disclosed embodiments. In some embodiments, the process of FIG. 2 is performed by Product Recommendation System 110 (e.g., Flat Lay Generator 112), while in other embodiments one or more steps of the process in FIG. 2 may be executed by another system (e.g., Company Device(s) 106). At Step 201, Flat Lay Detector 112 may receive and/or detect a newly available product. For example, Flat Lay Detector 112 may receive product images of newly available products and/or detect newly available products have been uploaded into Product Database 128 (e.g., because they do not have a flat lay identifier) and retrieve the associated product images.

At Step 203, Flat Lay Generator 112 may process the received product images of the newly available products using Flat Lay Detector 132 machine learning model. As described above, in some embodiments, Flat Lay Detector may determine product images are flat lay images when clothing is not being worn by a model and may determine product images are not flat lay images when the product is being worn by a model. In some embodiments, Flat Lay Detector 132 may determine product images are flat lay images when there is no background scenery in the images and may determine product images are not flat lay images when there is background scenery in the product images. In some embodiments, Flat Lay Detector 132 may determine product images are flat lay images when clothing is not being worn by a model and there is no background and all other images may be determined as not flat lay images.

At Step 205, if a product image is a flat lay image, the product image will be associated with an identifier indicating it is a flat lay image in a memory of Product Recommendation System 110 and/or Product Database 128. For example, the product identifier and a flat lay identifier may be associated in a searchable table or in any other format that allows for access by Product Recommendation System 110 (e.g., for seed product generation by Seed Product Generator 114).

At Step 207, if a product image is not a flat lay image, the product image will be associated with an identifier indicating it is not a flat lay image in a memory of Product Recommendation System 110 and/or Product Database 128. For example, the product identifier and a not flat lay identifier may be associated in a searchable table or in any other format that allows for access by Product Recommendation System 110 (e.g., for seed product generation by Seed Product Generator 114).

Figure 3:
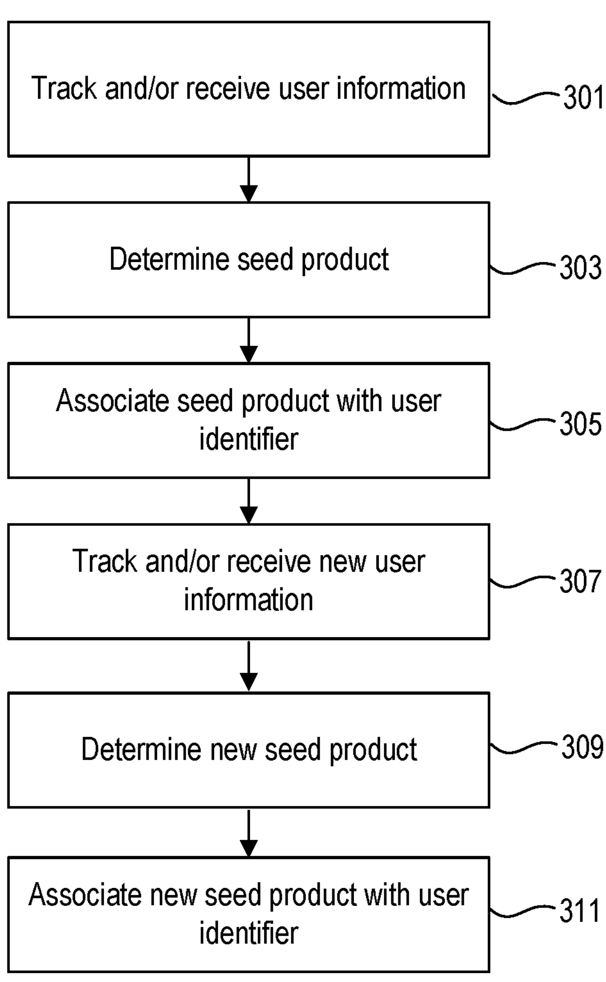
FIG. 3 illustrates a flow chart for determining a seed product vector for a user, consistent with the disclosed embodiments.

FIG. 3 illustrates a flow chart for determining a seed product vector for a user, consistent with the disclosed embodiments. In some embodiments, the process of FIG. 3 is performed by Product Recommendation System 110 (e.g., Seed Product Generator 114), while in other embodiments one or more steps of the process in FIG. 3 may be executed by another system (e.g., User Device(s) 102 and/or Company Device(s) 106).

At Step 301, Seed Product Generator 114 may track user information on User Device(s) 102 and/or receive information from User Device(s) 102. As described above, user information may include user interactions (e.g., views), user characteristics, and/or user selections.

At Step 303, Seed Product Generator 114 may determine a seed product by inputting user information into Seed Product Detector 136, as described above. In some embodiments, the Seed Product Generator 114 may first filter available products to only search for available products with flat lay images as the seed product. For example, Seed Product Generator 114 may filter Product Database 128 for available products with a flat lay image tag for input into Seed Product Detector 136. Seed Product Detector 136 may indicate which of the available products with flat lay images most closely matches the user information. For example, Seed Product Detector 136 may determine, as the seed product, an available product with a flat lay image whose product attributes (e.g., attributes indicated by product tags or image recognition model(s)) best match product attributes associated with user preferences derived from user interactions, user selections, and/or user characteristics.

At Step 305, Seed Product Generator 114 may associate the seed product with the user. For example, in some embodiments, Seed Product Generator 114 may store a user identifier of the user in association with a product identifier of the seed product. For example, Seed Product Generator 114 may associate the user identifier and product identifier in a memory of the Product Recommendation System 110 and/or in the Product Database 128. For example, the user identifier and product identifier may be associated in a searchable table or in any other format that allows for access by Product Recommendation System 110 (e.g., Recommended Product Generator 124). In some embodiments, Seed Product Generator 114 may further create (e.g., through a CLIP model of Product Similarity Detector 134) and/or store a vector associated with the seed product.

At Step 307, Seed Product Generator 114 may track new user information on User Device(s) 102 and/or may receive new information from User Device(s) 102. For example, Seed Product Generator 114 may track new user interactions and/or selections on User Device(s) 102. Seed Product Generator 114 may track and/or receive user information regarding a user viewing additional details on a product, viewing a product image, adding a product for checkout, inputting payment information, returning a product, and/or purchasing a product. Further, Seed Product Generator 114 may track and/or receive new user information on user selections, such as user preferences on style, fit, and/or occasion made through User Device(s) 102 (e.g. on company webpage interface, such as User Interface 400 in FIG. 4B shown below).

At Step 309, Seed Product Generator 114 may determine a new seed product based on the new user information. In some embodiments, determining the new seed product may include performing Steps 301-305 again with the new user information. In some embodiments, determining a new seed product may include using a different model, such as Product Similarity Detector 134 machine learning model. Product Similarity Detector 134 may include a CLIP model described above with reference to FIG. 1A. Seed Product Generator 114 may use Image Encoder 140 to determine a vector associated with the new user information. For example, Image Encoder 140 may determine a vector associated with a viewed product, a product added for checkout, a product with payment information added, a returned product, and/or a purchased product. For example, Seed Product Generator 114 may use Text Encoder 138 or Image Encoder 140 to determine a vector associated with user selections, such as user preferences on style, fit, and/or occasion.

The Seed Product Generator 130 may modify a vector associated with the seed product by a vector associated with the new user information. In some embodiments, a vector associated with new user information reflective of user preferred product attributes may be added to the seed product vector, Vnew_search=Vseed+Vnew_user_info. In some embodiments, vector associated with new user information reflective of user preferred product attributes may be added to the seed product vector and a vector associated with the new user information reflective of user not-preferred product attributes may be subtracted from the seed product vector, Vnew_search=Vseed+Vnew_user_info−Vnot_user_information. For example, Vnew_user_info may refer to a vector associated with the user selection "tight fitting" and the Vnot_user_information may refer to a vector associated with loose fitting clothing.

A new seed product may be determined based on comparing the modified vector, Vnew_search, with vectors of available products (excluding the vector associated with the seed product). In some embodiments, vectors of available products may be stored in Product Database 128 and/or a memory of Product Recommendation System 110. In some embodiments, Seed Product Generator 130 may create vectors of available products, such as by inputting product images of the products into CLIP model Image Encoder 140. Seed Product Generator 130 may determine new seed product to be the available product whose vector has the largest cosine similarity to the modified vector. For example, Similarity $(V1, V2)=\cos\theta=(V1\cdot V2)/(\|V1\|\|V2\|)$.

At Step 311, Seed Product Generator 114 may associate the new seed product with the user. For example, in some embodiments, Seed Product Generator 114 may store the user identifier of the user with a product identifier of the new seed product and/or a vector of the new seed product. For example, Seed Product Generator 114 may associate the user identifier, product identifier, and/or vector of the new seed product in a memory of the Product Recommendation System 110 and/or in the Product Database 128. For example, the user identifier, product identifier, and/or vector of the new seed product may be associated in a searchable table or in any other format that allows for access by Product Recommendation System 110.

Determining a seed product, as described above, allows for capturing product attributes that a user may have preferences on without the need to store product tags associated with each attribute, saving computer storage space. Further, as described below, Product Recommendation System 110 may search for similar products based on one or more search inputs. Therefore, the preferred seed product attributes can be automatically included in a new search without loading new product tag selections for each new search, ensuring a computerized system hosting the company webpage (or another selection interface) is not overloaded.

In some embodiments, Seed Product Generator 114 may store additional information associated with the user. In some embodiments, Seed Product Generator 114 may further store product identifiers and/or vector representations of products (e.g., based on CLIP Model Image Encoder 140) associated with user interactions and/or user selections. For example, Seed Product Generator 114 may store the user identifier of the user with a product identifier of a product and/or a vector of the product that the user viewed, added for checkout, and/or purchased. In some embodiments. Seed Product Generator 114 may further store the user identifier of the user with one or more old seed product identifiers and/or old seed product vectors.

In some embodiments, Seed Product Generator 114 may perform Steps 309 and 311 after a set period of time, such as a period of time established by a company user though Company Device(s) 106. For example, Seed Product Generator 114 may track and/or receive new user information for the set period of time at Step 307, and then determine a new seed product at Steps 309 and 311 based on the new user information received in the period of time. In some embodiments, Steps 309 and 311 may be performed each time the Seed Product Generator 114 detects new user information at Step 307.

Figure 4A:
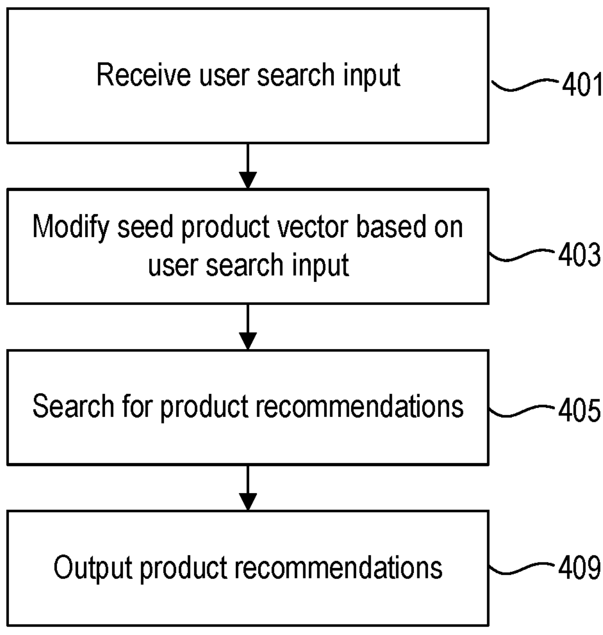
FIG. 4A illustrates a flow chart for recommending a product to a user based on user input, consistent with the disclosed embodiments.
Figure 4B:
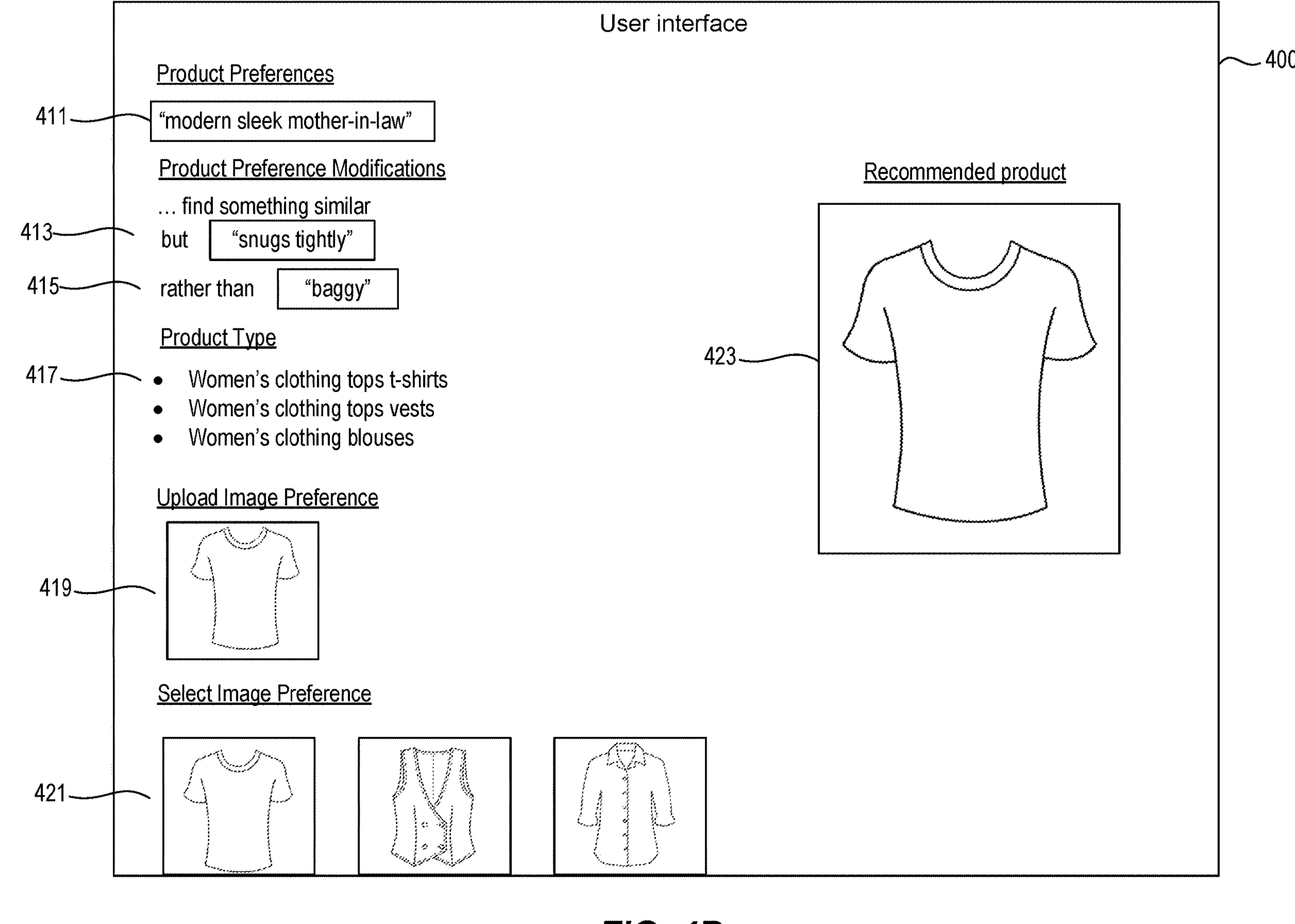
FIG. 4B illustrates a user interface for making selections and providing the recommended products to a user, consistent with the disclosed embodiments.

FIG. 4A illustrates a flow chart for recommending a product to a user based on user input, consistent with the disclosed embodiments. In some embodiments, the process of FIG. 4A is performed by Product Recommendation System 110 (e.g., Recommended Product Generator 124), while in other embodiments one or more steps of the process in FIG. 4 may be executed by another system (e.g., User Device(s) 102 and/or Company Device(s) 106).

At Step 401, Recommended Product Generator 124 may receive a user search input through User Device(s) 102. In some embodiments, the user search input may include constrained text, such as text selected from an available list of text options (e.g., FIG. 4B Product Type 417 on User Interface 400). In some embodiments, the user search input may include unconstrained text, such as any combination of words or phrases (e.g., FIG. 4B Product Preferences 411 and/or Product Preference Modifications 413 and 415). In some embodiments, the user search input may include an unconstrained image, such as an image uploaded by the user (e.g., FIG. 4B Upload Image Preference 419). In some embodiments, the user search input may include a constrained image, such as an image selected from an available of image options (e.g., FIG. 4B Select Image Preference 421). In some embodiments, User Device(s) 102 may provide interface element(s) that allow a user to weight one or more search inputs. In some embodiments, User Device(s) 102 may be configured to receive input (e.g. from a user) of a weight as a percentage or fraction. In some embodiments, User Device(s) 102 may be configured to receive input (e.g., from a user) of a rating for one or more search inputs, that may be converted to a weight based on the highest possible rating (e.g. rating of 1 out of 10 becomes weight of 0.1).

At Step 403, Recommended Product Generator 124 may modify the seed product vector based on user search input and the search input type. In some embodiments, Recommended Product Generator 124 may search a memory of Product Recommendation System 110 and/or search Product Database 128 using a user identifier associated with the user to retrieve a product identifier of the seed product and/or a seed product vector. In some embodiments, Recommended Product Generator 124 may create the seed product vector at Step 403. For example, Recommended Product Generator 124 may input a product image of the seed product into CLIP model Image Encoder 140 to create a seed product vector.

The Recommended Product Generator 124 may modify the seed product vector with the new user search input by inputting the search input into a Product Similarity Detector 134 including a CLIP model. In some embodiments, search input may be constrained text or unconstrained text. The Recommended Product Generator 124 may input the constrained text or unconstrained text into CLIP model Text Encoder 138 to create a vector associated with the user search input. In some embodiments, search input may be a constrained image or an unconstrained image. The Recommended Product Generator 124 may input the constrained image or unconstrained image into Image Encoder 140 to create a vector associated with the user search input.

In some embodiments, the search input text and/or images may include product attributes that a user prefers. In some embodiments, the search input text and/or images may include product attributes that a user does not prefer (e.g., FIG. 4B Product Preference Modifications 415). In some embodiments, the vector associated with the user search input reflective of user preferred product attributes may be added to the seed product vector, $V_{new\_search}=V_{seed}+V_{user\_preferred\_input}$. In some embodiments, the vector associated with the user search input reflective of user not-preferred product attributes may be subtracted from the seed product vector, $V_{new\_search}=V_{seed}-V_{user\_not\_preferred\_input}$. In some embodiments, the vector associated with the user search input reflective of user preferred product attributes may be added to the seed product vector and the vector associated with the user search input reflective of user not-preferred product attributes may be subtracted from the seed product vector, $V_{new\_search}=V_{seed}+V_{user\_preferred\_input}-V_{user\_not\_preferred\_input}$.

As described above, in some embodiment, as user may weight one or more of the selections. Therefore, in the above equations, one or more vector modifications may be multiplied by its respective weight. For example, $V_{new\_search}=V_{seed}+w_1 \cdot V_{user\_preferred\_input1}-w_2 \cdot V_{user\_not\_preferred\_input2}$.

In some embodiments, a user may select multiple preferences. For example, the user may input two or more selections reflective of user preferred product attributes and/or two or more selections reflective of user not-preferred product attributes. In some embodiments, the addition and/or subtraction of multiple vectors associated with the user search input may be the same as described above.

In some embodiments, the addition and/or subtraction of vectors describe above may be addition and/or subtraction of normalized vectors. For example, in some embodiments, one or more vectors may be normalized by dividing by the magnitude of the respective vector.

At Step 405, Recommended Product Generator 124 may search available products to determine which one most closely matches user preferences indicated by user search input and assign the closest match available product as the recommended product. In some embodiments, Recommended Product Generator 124 may search a subset of available products based on user selections. For example, Product Generator 124 may filter Product Database 128 for a products with a product type tag that matches user selections on product type (e.g., FIG. 4B Product Type 417) prior to searching for a product that most closely matches user preferences. In some embodiments, product type may refer to a gender (e.g., women, men), a type of clothing (e.g., top, pants, dresses, shoes), a size (e.g., small, medium, large), and/or an occasion (e.g., casual, work, night-out). In some embodiments, the available product that most closely matches user preferences is the one whose vector has the largest cosine similarity with modified seed product vector, $V_{new\_search}$ For example: Similarity $(V_{new\_search}, V_{available\_product})=\cos\theta=(V_{new\_search}\cdot V_{available\_product})/(\|V_{new\_search}\|\|V_{available\_product}\|)$. In some embodiments, the vector associated with the seed product may be excluded when searching for the closest match.

In some embodiments, Recommended Product Generator 124 may determine multiple product recommendations based on a requested number of products set by a user (e.g., through User Device(s) 102) and/or set by a company user (e.g., through Company Device(s) 106). In some embodiments, Recommended Product Generator 124 may determine, as recommended products, available products with a similarity value (e.g., cosine similarity) above a set threshold. In some embodiments, Recommended Product Generator 124 may rank available products based on their cosine similarity and provide, as recommended products, available products with a set ranking. For example, an available product with a larger cosine similarity is given higher rank than an available product with a lower cosine similarity.

At Step 409, Recommended Product Generator 124 may output product recommendations to the user through User Device(s) 102. For example, in some embodiments, the Recommended Product Generator 124 may display an image of the recommended product and/or product details on an interface of User Device(s) 102 (e.g., FIG. 4B Recommended Product 423). For example, in some embodiments, Recommended Product Generator 124 may send an image of the recommended product and/or product details of the recommended product through an email, push notification, SMS notification, and/or MMS notification to User Device(s) 102. In some embodiments, as described above, Recommended Product Generator 124 may select multiple available products and output them as recommended products.

In some embodiments, Recommended Product Generator 124 may further output product recommendations to Company Device(s) 106. For example, the Recommended Product Generator 124 may send a product identifier of the recommended product, product image(s) of the recommended product, and/or details on the recommended product to the Company Device(s) 106. Company Device(s) 106 may incorporate the recommended product into marketing materials it sends to User Device(s) 102 (e.g., through an email, push notification, SMS notification, and/or MMS notification). In some embodiments, Recommended Product Generator 124 and/or Company Device(s) 106 may associate a product identifier for the recommended product with a user identifier in a memory of the Product Recommendation System 110 and/or in the Product Database 128. For example, the user identifier and product identifier may be associated in a searchable table or in any other format that allows for access by Product Recommendation System 110.

Determining a recommended product, as described above, allows for capturing product attributes that a user may prefer (and avoiding un-preferred attributes) without the need to store product tags associated with each attribute, saving computer storage space. For example, in lieu of storing a variety of product tags reflective of user preferred product attributes, Product Recommendation System 110 may simply modify a vector of the seed product by a vector representation of text (e.g., "summer") and/or an image (e.g., of a celebrity) reflecting the user's preferred (or un-preferred) attributes.

Further, as described above, Product Recommendation System 110 accommodates additional search inputs by simply further modifying the vector of the seed product by a vector representation of text and/or an image reflecting the user's additional preferred (or un-preferred) attributes. Therefore, Product Recommendation System 110 ensures a computerized system hosting the webpage is not overloaded by re-loading a variety of product tags for each new user search.

FIG. 4B illustrates a user interface for making selections and providing the recommended products to a user, consistent with the disclosed embodiments. In some embodiments, Product Recommendation System 110 may provide User Interface 400 on User Device(s) 102. In some embodiments, User Interface 400 may be a company webpage of a company associated with Company Device(s) 106. In some embodiments, Recommended Product Generator 124 may code User Interface 400 to provide an indication of the type of user input received. For example, User Interface 400 may be coded so that input received under Product Preferences 411, Product Preference Modifications 413, Product Type 417, Upload Image Preference 419, and Select Image Preference 421 are identified as indicative of user preferred product attributes, and input received under Product Preference Modifications 415 is identified as user not-preferred product attributes. While FIG. 4B depicts an example of some of the user selections that may be received, User Interface 400 may include a different number and/or arrangement of user selections. Further, the User Interface 400 may include additional user selection options for indicating not-preferred product attributes, such as an option to select constrained text indicative of not-preferred product attributes, uploading an image reflective of not-preferred product attributes, and/or selecting an image reflective of not-preferred product attributes. Further, User Interface 400 may include multiple interface panes or pages that may be navigated between.

Recommended Product Generator 124 may display the recommended product with closest similarity to the user selections at Recommended Product 423 on User Interface 400. In some embodiments, as described above, multiple recommended products may be provided. Recommended Product Generator 124 may output product recommendations in a manner that conveys the recommended product that best matches user preferences. For example, Recommended Product Generator 124 may place recommended product image and/or product details of the best match recommended product at the top of the User Interface 400 and/or in a larger format than the other recommended products. In some embodiments, Recommended Product Generator 124 may code the user interface to allow a user to click, swipe, and/or scroll through recommended products. In some embodiments, Recommended Product Generator 124 may order the display of recommended products from best match (e.g., largest cosine similarity to vector indicative of user preferences) to worst match (e.g., least cosine similarity to vector indicative of user preferences).

Figure 5:
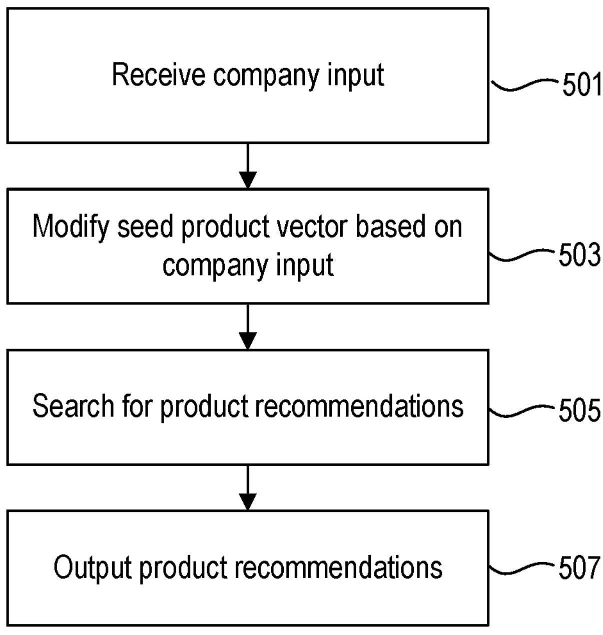
FIG. 5 illustrates a flow chart for recommending a product to a user based on company input, consistent with the disclosed embodiments.

FIG. 5 illustrates a flow chart for recommending a product to a user based on company input, consistent with the disclosed embodiments. Company input may include product preferences (e.g., for advertising purposes) made by a company user on Company Device 106. In some embodiments, the process of FIG. 5 is performed by Product Recommendation System 110 (e.g., Recommended Product Generator 124), while in other embodiments one or more steps of the process in FIG. 5 may be executed by another system (e.g., Company Device(s) 106). At Step 501, Recommended Product Generator 124 may receive company input through a user interface of Company Device(s) 106. In some embodiments, Recommended Product Generator 124 may provide an interface that allows a company user to input marketing parameters such as a time and/or frequency for outputting a recommended product to a user through User Device(s) 102, a means of outputting a recommended product to a user (e.g., through display on a webpage (e.g., FIG. 4B Recommended Product 423), an email, push notification, SMS notification, or MMS notification), and/or selections for one or more recommended product(s) to be provided to a user.

In some embodiments, Recommended Product Generator 124 may provide an interface on Company Device(s) 106 that allows for a company user to input unconstrained text, constrained text, unconstrained images, and/or constrained images to indicate preferred product attributes and/or not-preferred product attributes. For example, in some embodiments, a company may desire to sell cold-weather clothes and may input unconstrained text "winter" at a user interface element to indicate preferred products and/or "summer" at a user interface element to indicate not-preferred products.

In some embodiments, Recommended Product Generator 124 may provide an interface element on Company Device(s) 106 that allows a company user to select options for modifying the seed product based on user information of other users with the same seed product. For example, Recommended Product Generator 124 may be configured to receive input (e.g., from a user using Company Device(s) 106) to vary the seed product based on one or more of: products viewed by other users with the same seed product, products added for checkout by other users of the same seed product, products purchased by other users with the same seed product, or products included in an old seed product of other users with the same seed product.

In some embodiments Recommended Product Generator 124 may provide an interface element that allows a company user to select the seed product as a recommended product and/or set a number of products that are most similar to the seed product as recommended product(s).

As described above, in some embodiments, a company user may set multiple recommended products using an interface of Company Device(s) 106. For example, a company user may set the seed product as a recommended product and may input one or more product attributes for one or more additional recommended products (e.g, "red" for a second recommended product attribute, "winter" for a third recommended product attribute etc.).

In some embodiments, Recommended Product Generator 124 may provide an interface on Company Device(s) 106 that allows for a company user to indicate a user identifier and/or user characteristics of a user who will receive the recommended product. For example, in some embodiments, a company may desire to market products that reflect a clothing style of a particular celebrity to women and may input an image of that celebrity and select users with a user characteristic indicating they are a woman.

At Step 503, Recommended Product Generator 124 may modify the seed product vector based on company input and company input type. In some embodiments, Recommended Product Generator 124 may search a memory of Product Recommendation System 110 and/or search Product Database 128 using the user identifier(s) received at Step 501 to retrieve a product identifier of the seed product and/or a seed product vector. In some embodiments, Recommended Product Generator 124 may create the seed product vector at Step 503. For example, Recommended Product Generator 124 may input a product image of the seed product into CLIP model Image Encoder 140 to create a seed product vector.

The Recommended Product Generator 124 may modify the seed product vector with the new company user input. In some embodiments, company user input may be constrained text or unconstrained text. The Recommended Product Generator 124 may input the constrained text or unconstrained text into CLIP model Text Encoder 138 to create a vector associated with the company user input. In some embodiments, company user input may be a constrained image or an unconstrained image. The Recommended Product Generator 124 may input the constrained image or unconstrained image into CLIP model Image Encoder 140 to create a vector associated with the company user input. The search input text and/or images may include product attributes that a company prefers to advertise to a user. The search input text and/or images may further include product attributes that the company does not prefer to advertise to a user. In some embodiments, the vector associated with the company's preferred product attributes may be added to the seed product vector, $V_{new\_search}=V_{seed}+V_{company\_preferred\_input}$. In some embodiments, the vector associated the company's not-preferred product attributes may be subtracted from the seed product vector, $V_{new\_search}=V_{seed}-V_{company\_not\_preferred\_input}$. In some embodiments, the vector associated with the company's preferred product attributes may be added to the seed product vector and the vector associated with the company's not-preferred product attributes may be subtracted from the seed product vector, $V_{new\_search}=V_{seed}+V_{company\_preferred\_input}-V_{company\_not\_preferred\_input}$.

In some embodiments, a company user may select multiple preferences. For example, the company user may input two or more selections reflective of the company's preferred products and/or two or more selections reflective of the company's not-preferred products. In some embodiments, the addition and/or subtraction of multiple vectors associated with the user search input may be the same as described above.

In some embodiments, Recommended Product Generator 124 may modify the seed product vector based on company user input indicating seed product modifications to be made based on user information of other users whose seed products match (e.g., same stored seed product identifier). For example, Recommended Product Generator 124 may determine a vector $V_{other\_users}$ associated with the most common product viewed, purchased, added for checkout, and/or included in an old seed product by users with the same seed product. The vector, $V_{other\_users}$, may be a stored vector or may be created by inputting product image(s) associated with the most common product into CLIP model Image Encoder 140. The vector associated with other users may be added to the seed product, $V_{new\_search}=V_{seed}+V_{other\_users}$.

In some embodiments, the addition and/or subtraction of vectors describe above may be addition and/or subtraction of normalized vectors. For example, in some embodiments, one or more vectors may be normalized by dividing by the magnitude of the respective vector. In some embodiments, company user may not modify the seed product vector, and seed product vector will be used as $V_{new\_search}$ for the recommended product.

At Step 505 Recommended Product Generator 124 may search vectors of available products to determine which one most closely matches company preferences indicated by company user search input and assign the closest match available product as the recommended product. In some embodiments, Recommended Product Generator 124 may search a subset of available products based on company user selections. Product Generator 124 may filter Product Database 128 for products with a product type tag that matches a product type selected by the company user prior to searching for a product that most closely matches company user preferences. For example, Recommended Product Generator 124 may search for only tops based on a company user selection indicating the company would like to recommend tops. In some embodiments, the available product that most closely matches company preferences is the one whose vector has the largest cosine similarity with modified seed product vector, Vnew_search. For example:

$$\text{Similarity}\ (V_{new\_search}, V_{available\_product}) = \cos\theta = (V_{new\_search} \cdot V_{available\_product})/(\|V_{new\_search}\|\ \|V_{available\_product}\|).$$

In some embodiments, the vector associated with the seed product may be excluded when searching for the closest match.

In some embodiments, Recommended Product Generator 124 may determine multiple product recommendations based on a requested number of products set by a company user (e.g., through Company Device(s) 106). In some embodiments, Recommended Product Generator 124 may determine, as recommended products, available products with a similarity value (e.g., cosine similarity) above a set threshold. In some embodiments, Recommended Product Generator 124 may rank available products based on their cosine similarity and provide, as recommended products, available products with a set ranking. For example, an available product with a larger cosine similarity is given higher rank than an available product with a lower cosine similarity.

At Step 507, Recommended Product Generator 124 may output product recommendations to the user through User Device(s) 102. For example, in some embodiments, the Recommended Product Generator 124 may display an image of the recommended product and/or product details on an interface of User Device(s) 102 (e.g., FIG. 4B Recommended Product 423). For example, in some embodiments, Recommended Product Generator 124 may send an image of recommended product and/or product details through an email, push notification, SMS notification, and/or MMS notification to User Device(s) 102. In some embodiments, as described above, multiple products may be selected and output as recommended products. Recommended Product Generator 124 may repeat Steps 503-507 for each user identifier provided by a company user in Step 501.

In some embodiments, Recommended Product Generator 124 and/or Company Device(s) 106 may associate a product identifier for the recommended product with a user identifier in a memory of the Product Recommendation System 110 and/or in the Product Database 128. For example, the user identifier and product identifier may be associated in a searchable table or in any other format that allows for access by Product Recommendation System 110.

Determining a recommended product, as described above, allows for capturing product attributes that a company may prefer to advertise (and avoiding un-preferred attributes) without the need to store product tags associated with each attribute, saving computer storage space. For example, in lieu of storing a variety of product tags reflective of company preferred product attributes, Product Recommendation System 110 may simply modify a vector of the seed product by a vector representation of text (e.g., "winter") and/or an image (e.g., of a funeral attendee) reflecting the company's preferred (or un-preferred) attributes.

Further, as described above, Product Recommendation System 110 accommodates additional search inputs by simply further modifying the vector of the seed product by a vector representation of text and/or an image reflecting the company's additional preferred (or un-preferred) attributes. Therefore, Product Recommendation System 110 ensures a computerized system hosting the webpage is not overloaded by re-loading a variety of product tags for each new user search.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. Disclosed embodiments may, moreover, include any one of the features in the claims, alone or in combination with one or more other feature in the claims, whether implemented as a method, by at least one processor, and/or stored as executable instructions on non-transitory computer readable media.

It is intended, therefore, that the specification and examples be considered as illustrative only, with a true scope and spirit being indicated by the following claims and their full scope of equivalents.

What is claimed is:

1. A vector-based system for predictive recommendation generation, the system comprising:
   - a memory storing instructions;
   - a machine learning model; and
   - at least one processor configured to execute the instructions to:
     - train the machine learning model to determine attribute categories that impact consumer behavior;
     - predict a seed product from a product database using the machine learning model;
     - encode visual attributes of an image of the seed product into a vector representation of the seed product;
     - receive information indicative of the user's product preferences;
     - modify the vector representation of the seed product based on the user's product preferences to obtain a modified seed product vector;
     - search vector representations of products in the product database using the modified seed product vector to find a vector representation that is the closest match to the modified seed product vector; and
     - output to the user, based on the results of the search, a recommended product from the product database corresponding to the closest match vector.

2. The system of claim 1, wherein the information indicative of the user's product preferences is based on the user's interactions with a device.

3. The system of claim 2, wherein the user's interactions include at least one of: clicking on information associated with a product, viewing information associated with a product, adding a product for checkout, returning a product, or purchasing a product.

4. The system of claim 2, wherein the at least one processor is further configured to:
   - generate a user interface for sending to the device for display;
   - wherein the user's interactions include at least one of:
     - typing product preferences on the user interface,
     - selecting a displayed text description of product preferences on the user interface,
     - uploading an image to the user interface,
     - selecting an image generated on the user interface, or
     - inputting weights for product preferences on the user interface.

5. The system of claim 1, wherein outputting a recommended product to the user includes at least one of:
   - generating an email to the user with information on the recommended product,
   - generating a user interface for sending to a device for display with information on the recommended product,
   - generating a mobile push notification for sending to a device for display with information on the recommended product,
   - generating an advertisement push notification for sending to a device for display with information on the recommended product,
   - adding information on the recommended product to a queue for sending to a device for display, wherein the display time is based on at least one of: queue position, time of day, or geolocation,
   - generating an SMS notification for sending to a device for display with information on the recommended product, or
   - generating an MMS notification for sending to a device for display with information on the recommended product.

6. The system of claim 1, wherein the at least one processor is further configured to:
   - train a second model to detect whether a product image is a flat lay image of the product;
   - determine which images in the product database are flat lay images of the product using the second model; and
   - wherein predicting the seed product for the user comprises predicting the seed product from the determined flat lay images of the product.

7. The system of claim 1, wherein searching the product database comprises searching using a vision and language model trained to have large cosine similarity for correct pairings of image and text and small cosine similarity for incorrect pairings of image and text.

8. The system of claim 7, wherein the vision and language model is a neural network trained with at least one of: pairings of product images and corresponding text or pairings of non-product images and corresponding text.

9. The system of claim 1, wherein modifying the vector representation of the seed product includes at least one of: adding a vector representation of the user's product preferences to the vector representation of the seed product or subtracting a vector representation of the user's product preferences from the vector representation of the seed product.

10. The system of claim 1, wherein the at least one processor trains the machine learning model, and the machine learning model receives at least one of the following as input for the seed product prediction: information on the user's demographics, information on the user's purchase history, information on the user's interaction with an interface displaying product information, or information on user provided preferences.

11. The system of claim 10,
   - wherein modifying the vector representation of the seed product comprises:
     - creating a vector representation of the user's product preferences corresponding to one or more of the attribute categories, and
     - modifying the vector representation of the seed product using the vector representation of the user's product preferences to obtain the modified seed product vector.

12. The system of claim 1, wherein the closest match vector is the vector representation with the greatest cosine similarity to the modified seed product vector.

13. The system of claim 12, wherein the at least one processor is further configured to output a second recommended product from the product database corresponding to a vector representation with the second greatest cosine similarity to the modified seed product vector.

14. The system of claim 1,
   - wherein the information indicative of the user's product preferences is a text input; and
   - wherein modifying the vector representation of the seed product comprises:
     - encoding the text input into a vector representation of the text input; and modifying the vector representation of the seed product based on the vector representation of the text input.

15. A computer-implemented method for vector-based predictive recommendation generation, comprising:

training a machine learning model to determine attribute categories that impact consumer behavior;

predicting a seed product from a product database using the machine learning model trained for predicting a seed product;

encoding visual attributes of an image of the seed product into a vector representation of the seed product;

receiving information indicative of the user's product preferences;

modifying the vector representation of the seed product based on the user's product preferences to obtain a modified seed product vector;

searching vector representations of products in the product database using the modified seed product vector to find a vector representation that is the closest match to the modified seed product vector; and outputting to the user, based on the results of the search, a recommended product from the product database corresponding to the closest match vector.

16. The method claim 15, wherein the information indicative of the user's product preferences is based on the user's interactions with a device.

17. The method claim 16, wherein the user's interactions include at least one of: clicking on information associated with a product, viewing information associated with a product, adding a product for checkout, returning a product, or purchasing a product.

18. The method of claim 16, further comprising:

generating a user interface for sending to the device for display;

wherein the user's interactions include at least one of:

typing product preferences on the user interface, selecting a displayed text description of product preferences on the user interface, uploading an image to the user interface, selecting an image generated on the user interface, or inputting weights for product preferences on the user interface.

19. The method claim 15, wherein outputting a recommended product to the user includes at least one of:

generating an email to the user with information on the recommended product, generating a user interface for sending to a device for display with information on the recommended product, generating a mobile push notification for sending to a device for display with information on the recommended product, generating an advertisement push notification for sending to a device for display with information on the recommended product, adding information on the recommended product to a queue for sending to a device for display, wherein the display time is based on at least one of: queue position, time of day, or geolocation, generating an SMS notification for sending to a device for display with information on the recommended product, or generating an MMS notification for sending to a device for display with information on the recommended product.

20. The method of claim 15, further comprising:

training a second model to detect whether a product image is a flat lay image of the product;

determining which images in the product database are flat lay images of the product using the second model; and wherein predicting the seed product for the user comprises predicting the seed product from the determined flat lay images of the product.

21. The method of claim 15, wherein searching the product database comprises searching using a vision and language model trained to have large cosine similarity for correct pairings of image and text and small cosine similarity for incorrect pairings of image and text.

* * * * *